United States Patent [19]

Knitter

[11] 3,943,276
[45] Mar. 9, 1976

[54] RECORD TRACKING PICKUP STRUCTURE FOR A CAPACITIVE DISC

[75] Inventor: Roger W. Knitter, Hoffman Estates, Ill.

[73] Assignee: Zenith Radio Corporation, Chicago, Ill.

[22] Filed: June 3, 1974

[21] Appl. No.: 475,737

[52] U.S. Cl. .................. 178/6.6 R; 179/100.41 S; 179/100.41 G; 274/38; 179/100.1 B
[51] Int. Cl.² G11B 11/06; G11B 11/08; G11B 3/46
[58] Field of Search .............. 179/100.1 B, 100.4 M, 179/100.41 G, 100.41 K, 100.41 P, 100.41 B, 179/100.41 S; 274/38; 178/6.6 A, 6.6 R

[56] References Cited
UNITED STATES PATENTS

| 2,699,470 | 1/1955 | Koren | 179/100.41 S |
| 2,992,007 | 7/1961 | Bondley | 274/38 |
| 3,781,020 | 12/1973 | Batsch et al. | 274/38 |
| 3,826,877 | 10/1974 | Leedom | 179/100.1 B |
| 3,848,876 | 11/1974 | Joschko et al. | 274/38 |

*Primary Examiner*—Bernard Konick
*Assistant Examiner*—Alan Faber
*Attorney, Agent, or Firm*—Cornelius J. O'Connor

[57] ABSTRACT

A pickup structure for tracking records includes a stylus formed of a section from a diamond crystal. That section has the cross sectional configuration of a square and, when employed as a capacitive pick up, has a conductive coating on one face. Any of the four corners may be employed as a tracking stylus.

2 Claims, 6 Drawing Figures

U.S. Patent March 9, 1976 3,943,276 ant patent application Ser. No. 378,467 filed July 12, 1973 in the name of Robert Adler et al, now U.S. Pat. No. 3,872,241, issued Mar. 18, 1975.

RECORD TRACKING PICKUP STRUCTURE FOR A CAPACITIVE DISC

RELATED PATENT APPLICATION

The invention is useful for the capacitive pickup of the video disc image reproducing system described in application Ser. No. 378,467 filed July 12, 1973 in the name of Robert Adler et al, now U.S. Pat. No. 3,872,241, issued Mar. 18, 1975.

BACKGROUND OF THE INVENTION

A variety of systems have been proposed for reading video record discs to derive an electric signal that represents program information stored on the disc and is suitable for application to the antenna terminals of a color television receiver. Supplying that signal to the receiver permits image reproduction of the program carried by the disc. One such system is referred to as the electrostatic or capacitive type. It differs from mechanical and optical video disc playback systems in the requirements imposed on the disc and in the nature of the pickup structure.

More specifically, a video disc for use in the capacitive system has program information recorded in known fashion in a spiral track having undulations that constitute a spatial representation of a frequency modulated carrier signal conveying the program information and under the control of which the storage track shall have been formed. The storage track has a conductive layer and a superimposed dielectric layer to the end that a conductive stylus, traveling in and sensing the record track, constitutes in conjunction with the conductive and dielectric layers of the disc, a capacitor having a value of capacitance that varies with the undulations of the record track. This capacitance variation may be employed in known manner to control the operating frequency of an oscillator, for example, to develop a frequency modulated signal suitable for control of a color receiver. As thus far described, the capacitive system is well known and, as such, is not the contribution of the subject invention.

Practical forms of the capacitive system feature a stylus of a material that is very hard compared with the material of the disc, usually taking the form of a metallized sapphire or diamond. Since, as described above, the stylus is in physical contact with the record groove and must be in order to obtain maximum signal to noise ratio, it is subject to wear. The wear characteristics of the stylus are clearly influenced by the tracking force with which the stylus is brought to bear against the track as well as the distance traveled, that is to say, the product of the linear velocity of the disc and the tracking time. It is also influenced by the coefficient of friction of the stylus. For the most part, there is little leeway in minimizing the tracking force, disc speed or program time in order to increase the life of the stylus and consequently resort has been had to the use of gem stones or lubrication in order to have as great a stylus life as possible.

Stylii have been made of sapphires and diamonds, as stated, but this is prohibitively expensive unless some means, such as that proposed herein, is found for obtaining an acceptably long stylus life. It has been proposed, for example, that the disc have a lubricated surface so that the abrasion is reduced and the life of the stylus increased. There is a distinct preference, however, to avoid lubrication since such coatings have a tendency to collect dirt, they tend also to dry out and lose their lubricating qualities especially if they are water based and may also present undesirable packaging problems.

It is, therefore, a principal object of the invention to provide a pickup structure featuring a stylus for tracking grooves in a record disc and having a useful life which greatly exceeds that of prior devices.

It is a very particular object of the invention to provide an improved pickup device featuring greatly enhanced stylus life and especially suited for reading video record discs in capacitive video playback systems.

BRIEF SUMMARY OF THE INVENTION

A pickup structure embodying the invention is useful for tracking grooves in a record disc to derive information stored therein whether the disc be the familiar audio record or the more recent video disc which stores video information that may include luminance, chroma and synchronizing signal components. The structure comprises a sensing element of a substantially homogeneous material that is very hard compared with the material of the disc. The sensing element has a cross sectional configuration such that the element presents at least two angular shaped portions individually dimensioned to enter into the grooves of the disc and serve as a tracking stylus. In the preferred embodiment, the sensing element is a square section of a diamond crystal and any of its four corners may be presented in tracking relation to the disc that is to be read.

BRIEF DESCRIPTION OF THE DRAWING

The features of the invention which are believed to be novel are set forth with particularity in the appended claims. The invention, together with further objects and advantages thereof, may best be understood, however, by reference to the following description taken in conjunction with the accompanying drawing in the several figures of which like reference numerals identify like elements, and in which:

DESCRIPTION OF THE PREFERRED EMBODIMENT

Figure 1:
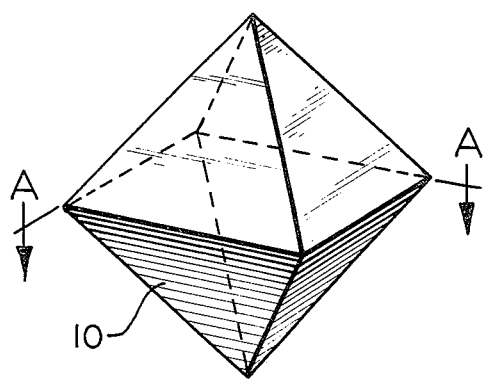
FIG. 1 represents a diamond crystal from which a pickup structure may be constructed in accordance with the teachings of the invention.
Figure 2:
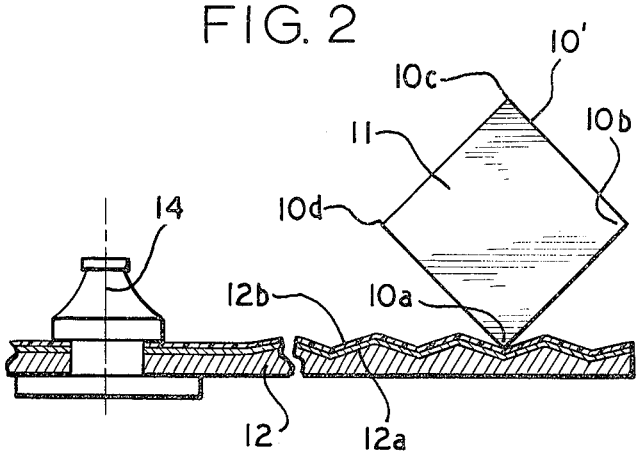
FIG. 2 is a sketch representing a pickup in accordance with the invention in tracking engagement with a record disc.

A pickup structure for tracking grooves in a record disc, embodying the invention, comprises a sensing element of a substantially homogeneous material that is hard compared with the material of the disc to be tracked in order that it may have long life in spite of the abrasion inherent in the mechanical coupling of the sensing element traversing the grooves of the record track of the disc. Since the invention has especial application to capacitive type pick up structures, it will be described in detail in that connection. The capacitive pick up may be thought of as a subassembly of a sensing or carrier element and an electrode carried by that element. Preferably, the carrier element is formed of gem stones, such as diamonds or sapphires, which obviously are very hard compared with the resinous materials from which record discs, audio or video, are ordinarily made. Of course, diamonds have the greatest hardness and longest life and are, therefore, preferred so long as they exhibit an acceptably long life so as to be commercially practicable. This necessary attribute is attainable by practicing the subject invention. The carrier element or stylus may be formed from a natural diamond or from industrial diamonds even those that are prepared from pressed diamond dust. FIG. 1 represents a diamond crystal 10 which may even be of the synthetic or commercially grown variety. If the upper part of the crystal is machined away to the plane A—A, there results a tetrahedron, which has a base that is square having 90° angles at its four corners. If the crystal is ground in this fashion it produces an element which may serve as a carrier so long as the crystal dimensions permit any of its corners or angular shaped portions to enter into the grooves of a record 12 in tracking relation thereto in the manner, for example, shown in FIG. 2. In that figure there is shown a segment of record 12 which is supported for rotation about a spindle 14, rotating into the plane of the drawing. The record support may be a turntable driven by a motor is essentially the same fashion as an audio record player which is well known and, accordingly, has only been indicated schematically. The grooves have a conductive metallic coating 12a and a superposed dielectric coating 12b characteristic of program discs used in capacitive video disc playback systems. One corner 10a of the crystal section 10' is presented in tracking relation to the record groove but since the section has geometrical symmetry any of the remaining corners 10b, 10c and 10d may likewise be used to track the record. Accordingly, the square shaped diamond section affords four corners, any of which may be selectively used as a tracking stylus to read a record.

Where the pickup is of the capacitive type under consideration, one face of the crystal section is provided with a conductive coating 11 so that the stylus presents a conductive surface riding on dielectric coating 12b of the record to constitute, in conjunction with the portion of conductive coating 12a immediately under the stylus, the variable capacitor of the capacitive pickup or disc reading system. As indicated in FIG. 2, it is desirable that the relative dimensions of the stylus and the record groove or track be such that the electrode area of the stylus be as large as practicable in order to minimize wear and yet the stylus will, of course, wear in use and hence will in effect grind or abrade away the tracking corner of the diamond which increases the area of the tracking surface. Ultimately, the diamond corner wears to the point that it becomes impractical to use since it will pick-up information from adjacent grooves. Consequently, the relative dimensions of the stylus and record groove are chosen for the longest effective life. The thickness of the diamond section that is, its dimension along the length of the record groove is not critical. By way of illustration, and not in any sense a limitation on the scope of the invention, diamond sections found useful for tracking a capacitive type video disc, having a 140° record groove storing a frequency modulated carrier signal having a normal frequency of 3.5MHz, had the following dimensions:

| | |
|---|---|
| crystal diagonal length | 20 mils |
| crystal thickness | 20 mils |
| conductive coating (chrome) | 2000 angstroms |

Applicant has discovered that a flat surface of a diamond crystal surface may be readily metallized as required to serve as a capacitive pickup. The diamond surface is first cleaned with dilute sulfuric or nitric acid and then placed in an oven and heated to 400°C for approximately twenty to thirty minutes. This prepares the surface of the diamond for metal deposition in which an effective bond is achieved at the interface between the coating material and the diamond surface. After cleaning, the diamond is placed in an oven located in a vacuum chamber and the chamber atmosphere is then reduced to approximately 5 torr after which the temperature is increased to 1000°C. After a short period of time, about ten to fifteen minutes, the temperature of the oven is reduced to the range of 750° to 800°C and then the chroma or other metal is vapor deposited to the desired thickness on one face of the diamond. Generally, the thickness is between 1,000 and 3,500 A. Acceptable diamond stylii have been made with the described process utilizing chrome as the metal surface and others have been constructed wherein the layer of chrome is overcoated with a layer of noble metal such as gold which is advantageous in inhibiting oxidation. Where it is desired to employ such an overcoat, the thickness of the chrome and gold layers are apportioned to maintain the total coating thickness within the desired range of 1,000 to 3,500 A.

Figure 3:
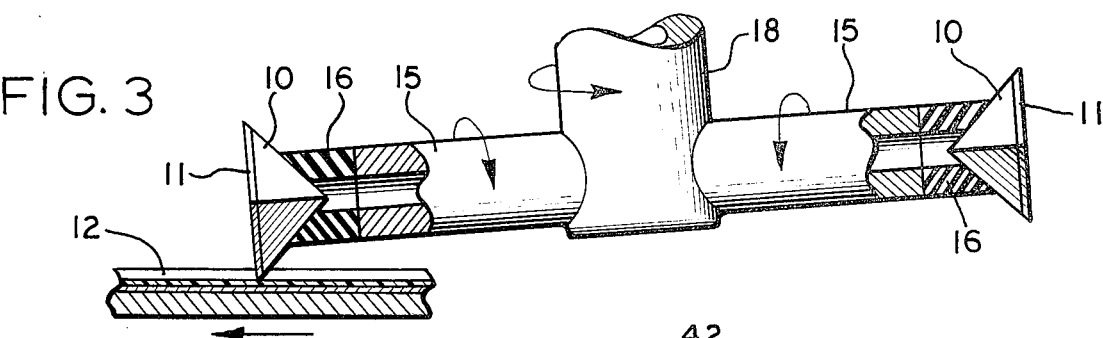
FIGS. 3 and 4 are representations of mechanical structures indicating the manner in which maximum useful life may be obtained from a pickup featuring the invention.

One way of preparing a stylus, starting with the crystal 10, is to mount the crystal in a holder and grind one side down to the face represented by the plane A—A of FIG. 1. FIG. 3 represents a pickup structure in which two such diamond sections have been formed and provided with a conductive coating 11. Each may be mounted to a holder 15 by means of a damping material 16, such as rubber, to provide a flexible mount for each crystal section. Each crystal is supported within its mount with its diagonal dimensions extending in vertical and horizontal planes so that a chosen corner of the diamond extends downwardly in proper position to be presented to a disc in order to track its record grooves. Each holder 15 is preferably rotatable about its longitudinal axis, as indicated by the arrows, in order that any of the four corners of either crystal may be selectively brought into tracking position. The two holders 15 are supported by a central shaft 18 which is also rotatable on its own axis so that either of the two crystal segments may be brought into tracking position by adjustment of shaft 18. One limitation in the dimensioning of the crystal sections is clear from the schematic of FIG. 3. In particular, it is necessary that the diagonal measure of the crystal exceed the vertical dimension of the holder 15 so that the selected corner of the crystal is free to enter into tracking engagement with the record groove.

Figure 4:
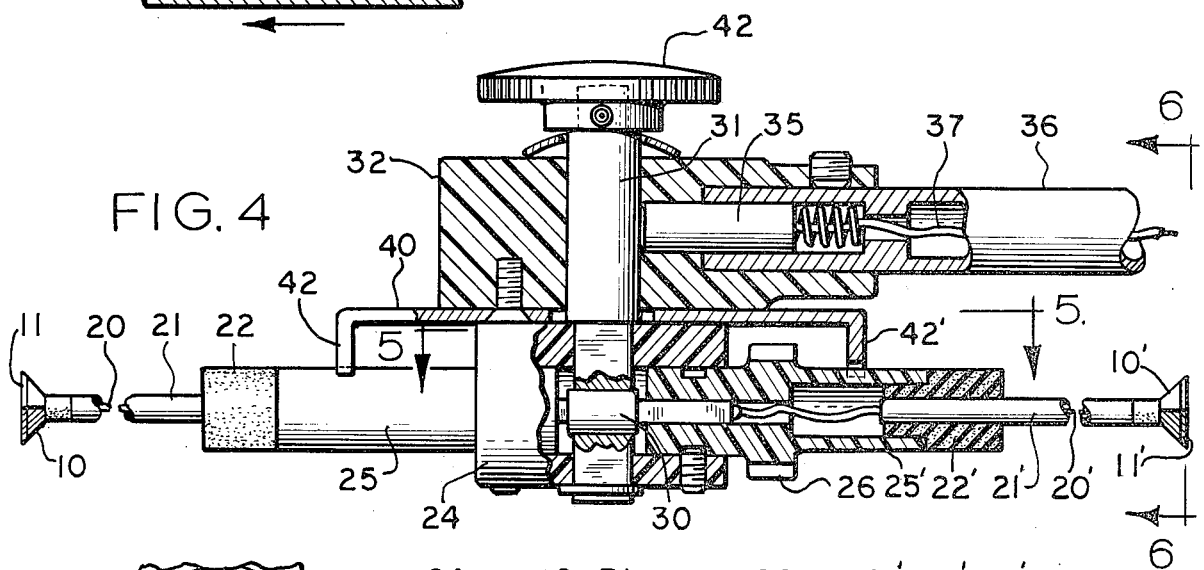
Figure 6:
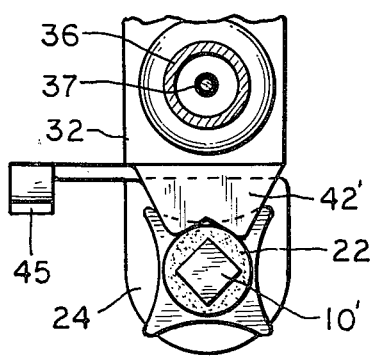
FIG. 6 is a fragmentary sectional view taken along lines 6—6 in FIG. 4.
Figure 5:
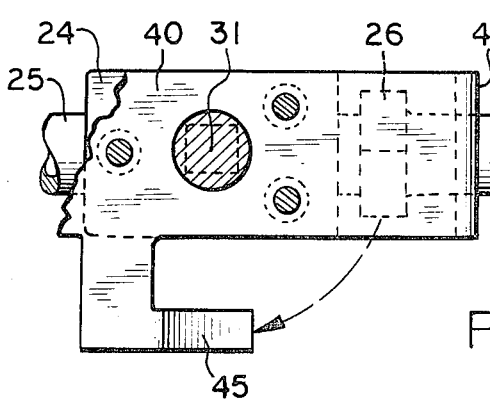
FIG. 5 is a fragmentary sectional view taken along lines 5—5 in FIG. 4.

The arrangement of FIG. 3 is merely suggestive of the mounting principles for utilizing two prism-type crystal sections in an arrangement that greatly extends the pickup life since it permits each of the four corners of both crystal sections to serve, one at a time, as a tracking stylus in reading capacitive records. A more practical structural arrangement is shown in FIG. 4 where each crystal is a flat square-shaped diamond section ground from a crystal like that of FIG. 1. One such section is shown attached to a conductor 20 by means of a conductive adhesive such as a conductive epoxy or silver solder. Conductor 20 may be housed within a tubular shield 21 as a protection against interference and a flexible or resilient cylinder 22 of damping material such as silastic or rubber compounds may couple the subassembly to a housing section 24 by means of a rotatable sleeve 25 of insulating material. It is convenient to duplicate the described arrangement to the end that the structure accommodates two such pickups extending in opposite directions from housing 24. The second subassembly is identified by primed reference numerals. As shown, sleeve 25' supports a four pointed star gear 26 which may serve as a cam follower to rotate sleeve 25' and crystal 10' through 90° when it is desired to change the corner serving as a stylus. A conductive sleeve 30 extends between and couples sleeve 25, 25' so that they may rotate together whenever cam follower 26 is advanced to change the stylus presentation of crystal sections 10, 10'. The conductors 20, 20' extend within conductive sleeve 30 and are capacitively coupled thereto. The circuitry of the pickup is then extended by a vertically disposed conductive sleeve 31 rotatably supported within a base 32 of the housing structure. The free end of sleeve 31 is apertured to receive conductve sleeve 30 so as to complete an AC path from either pickup device. From sleeve 31 the circuit extends through a conductive plug 35 projecting from the free end of a boom 36 which accommodates another conductive extension 37 of the pickup, simulating a coaxial structure. As described in the Adler et al application, boom 36 may couple with a lead screw or similar tracking arrangement required to advance the operative one of pickups 10, 10' from one convolution of the record groove to the next in a continuous reading of the record track. A suitable damping material for use in the crystal mount is silastic 731RTV distributed by Dow Corning of Midland, Michigan.

Between sections 24 and 32 of the pickup housing there is a support bracket 40 which has bifurcated vertically depending sections 42, 42' for releasably holding and supporting each of sleeves 25, 25' with one of the crystal sections presented in the tracking position. The selection between the available tracking elements is under the control of a knob 42 of insulating material carried at the free end of sleeve 31 for selective adjustment. Sleeve 31, while rotatable within stationary housing section 32, is preferably coupled through a force fit or otherwise to housing section 24 in order that sleeve 31 and section 24 may rotate together. The support plate 40 is affixed to stationary housing section 32 by a threaded fastener and is provided with a cam 45 which is disposed within the path of rotation of star gear follower 26. Accordingly, rotation of sleeve 31 by manipulation of knob 42 causes engagement of cam 45 with cam follower 26 and a 90° displacement of both sensing elements 10, 10'. In this manner, the stylii 10 and 10' are brought into the tracking position in alternation and once in each 360° revolution of knob 42 both stylii are rotated 90°, changing from one to another corner of the crystal sections.

The improvement in pickup life achievable with the described structures is obvious and may be better understood by representative figures of useful stylus life. Sapphire capacitive pickups of the prior art had a life of about 75 hours when used with video discs which rotated at 450 rpm but which could be extended to approximately 400 hours by resort to lubricating coating of the disc. The arrangements of this invention, by contrast, are expected to provide a stylus life for each crystal section of 600 hours for systems in which the disc rotates at 1800 rpm even without the aid of lubrication which, of course, could be adopted if desired.

While a particular embodiment of the present invention has been shown and described, it will be obvious to those skilled in the art that various changes and modifications may be made without departing from the invention in its broader aspects. Accordingly, the aim in the appended claims is to cover all such changes and modifications that may fall within the true spirit and scope of the invention.

What is claimed is:

1. A pickup structure for tracking a record disc having a metallized information-storage groove to derive information stored therein comprising:

a sensing element of a substantially homogeneous material that is hard compared with the material of the disc and having a cross sectional configuration such that the element presents at least two substantially identical angular-shaped and spaced apart corner portions individually dimensioned to enter into the grooves of said disc and serve as a tracking stylus, one surface of each of said angular shaped portions having a coating of conductive material which may constitute in conjunction with said metallized groove of said disc a variable capacitor presenting a capacitance determined by the information stored in said groove; and means for supporting said sensing element with any of said corner portions in tracking relation with said groove, said means being adjustable to change the orientation of said sensing element to bring a different one of said corner portions into tracking relation with said groove.

2. A pickup structure in accordance with claim 1 in which said sensing element is a tetragonal pyramidal section of a diamond crystal, a square base of which is covered with a layer of conductive material.

* * * * *